United States Patent [19]

D'Apuzzo

[11] 4,440,532
[45] Apr. 3, 1984

[54] DRILL BIT FOR DRILLING HOLES IN COMPOSITE FIBER/RESIN LAMINATES

[75] Inventor: Sebastiano D'Apuzzo, Naples, Italy

[73] Assignee: Aeritalia Societa Aerospaziale Italiana p.A., Naples, Italy

[21] Appl. No.: 284,839

[22] Filed: Jul. 20, 1981

[30] Foreign Application Priority Data

Aug. 1, 1980 [IT] Italy ............... 49404 A/80

[51] Int. Cl.³ ............ B23D 77/14; B23B 41/00; B26D 1/00
[52] U.S. Cl. ............ 408/229; 407/54
[58] Field of Search .......... 408/1 R, 199, 211, 223, 408/224, 228, 229; 407/30, 53, 54

[56] References Cited

U.S. PATENT DOCUMENTS

| 693,508 | 2/1902 | Fette | 407/54 |
| 1,069,930 | 8/1913 | Down | 408/223 |
| 2,113,178 | 4/1938 | Gase | 407/54 |
| 2,652,083 | 9/1953 | Emmons | 408/211 |
| 2,887,136 | 5/1959 | Rathgeber | 408/211 |
| 3,121,351 | 2/1964 | Mount | 408/228 |
| 4,338,050 | 7/1982 | Ozer et al. | 408/1 R |

Primary Examiner—E. R. Kazenske
Assistant Examiner—Paul M. Heyrana
Attorney, Agent, or Firm—Ladas & Parry

[57] ABSTRACT

A drill bit for drilling holes in laminates consisting of a matrix of plastic material incorporating graphite or glass fibers as used particularly in the aviation industry. The bit comprises cutting elements each of which presents a first straight sharp edge of very low conicity and positive rake and a second sharp edge having a convex curvature (FIG. 1).

4 Claims, 4 Drawing Figures

DRILL BIT FOR DRILLING HOLES IN COMPOSITE FIBER/RESIN LAMINATES

BACKGROUND OF THE INVENTION

This invention refers to a drill bit for drilling holes in composite materials consisting of fiber/resin laminates.

Among said laminates fiber glass reinforced plastic is included. However the invention is particularly suited for laminates consisting of a resin reinforced with carbon fibers of graphitic structure.

More particularly this invention is directed to laminates hereinafter indicated as "carboresins" formed by graphite fibers embedded in a matrix of epoxy resin.

A material of the type mentioned above is widely used, together with metal sheets, particularly in the aviation industry, for making both movable and fixed parts of airplanes due to its particular characteristics of being light and mechanically resistant.

In practice said carboresin laminates, of a few millimeters in thickness, are used in combination with sheet metal (generally aluminum). This combination is obtained by coupling such laminate and metal sheet face to face and then securing the combination through rivetting.

The combination must guarantee a perfect fluid seal: in fact no type of fluid (liquid or gas) should be capable of penetrating through the coupling of materials so obtained. The rivets, therefore, must be capable of sealing the two adjacent sheets in an absolutely perfect way without there being the possibility of infiltrations of fluids through the seats (i.e. the circular holes in the carboresin sheets) of the rivets themselves.

The drilling of the holes in carboresin laminates presents a great deal of technical difficulties. In fact the graphite fibers/epoxy resin laminate is formed by two phases having very different mechanical properties, i.e., the graphite fibers with a high modulus of elasticity and high mechanical strength and the epoxy resin matrix with low modulus and low mechanical strength.

These differences do not allow working on the composite material using conventional drill bits. In fact, due to the contrast between high elastic modulus and low resistance it is necessary that the stresses on the composite material caused by the penetrating and cutting tool be as small as possible, in order to avoid delamination, particularly of the last lamina at the backside of the sheet.

The bits conventionally used for metal materials, e.g., the bits for wood and the center-point helical bits, cause delamination of the sheet backside due to their geometry, yielding of the resin joining the last lamina to the previous one and a large stress concentration on such lamina.

The best suited bit profile for reducing the force of penetration, according to the conventional prior art, appears to be a bit profile having a high conicity. As a matter of fact the high conicity of the sides of said bits provides the appropriate force of penetration of the cutting edge in the material, with an axial thrust reduced with respect to normal helical bits. However, the front cutting edges often cause delamination along an area around the hole, which is larger than the surface of the hole itself. The delamination on unidirectional composite materials with this type of bit is caused also by the tool sides, because the axial force required in order that said sides may remove material is not sufficiently small. The conicity cannot be further increased, otherwise the bit would become too long, creating problems of dimensions during drilling of the hole.

SUMMARY OF THE INVENTION

It has now been found according to this invention, that an excellent execution of holes in materials of carboresin or glass resin type is obtained by means of a drill bit the cutting elements of which comprise a first straight sharp edge of very low conicity and a second sharp edge having a convex curvature profile.

Said first straight sharp edges are preferably placed on the tip of the bit, so as to lie along the bisecting lines of the angles of a regular polygon drawn on a plane perpendicular to the longitudinal axis of the bit and having its geometric center placed on said axis.

DESCRIPTION OF THE DRAWINGS

The present invention will be further illustrated with reference to the included drawings in which.

DESCRIPTION OF THE INVENTION

Figure 2:
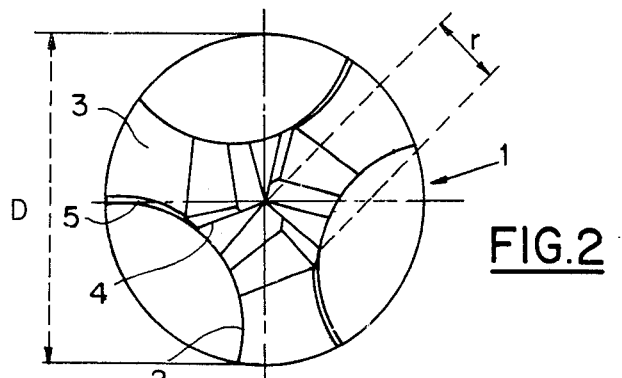
FIG. 2 is a plan top view of the bit.
Figure 1:
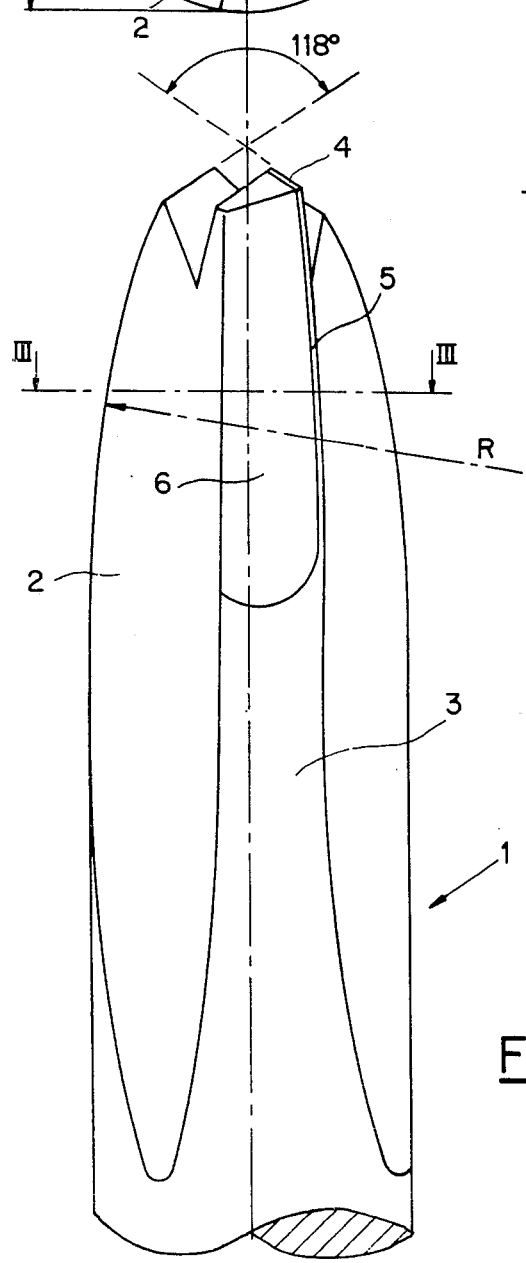
FIG. 1 is a side view of the bit according to the invention.

With reference to FIGS. 1 and 2, the stem of the bit indicated in 1 is provided with longitudinal grooves 2 of semicircular cross section, between which the cutting elements are formed, in number of three and indicated by the numeral 3.

Each cutting element 3 has two sharp edges, i.e. a first straight sharp edge indicated in 4 and a second curved sharp edge indicated in 5.

In the illustrated embodiment, the number of cutting elements is three and said straight sharp edges 4 are lying on a plane perpendicular to the longitudinal axis of stem 1, along the bisecting lines of a regular polygon with an odd number of sides, havings its geometric center on the axis of stem 1. Said polygon, in the embodiment represented in the figures, is an equilateral triangle, as can be seen in FIG. 2. The straight sharp edges 4 have a low conicity with respect to the longitudinal axis of stem 1 and preferably the angle formed by the two straight sharp edges 4 is of about 118°.

This is a characteristic of the present invention, since for drilling holes in carboresin type laminates, the teaching of the prior art is unanimous in indicating a high conicity of the straight cutting edges.

The length r of the straight sharp edges 4 is preferably comprised between 0.4 and 0.6 with respect to the radius length of a cross section of stem 1 and said straight sharp edges serve essentially the purpose of causing perforation of the material.

The curved sharp edges 5 comprise a first transition portion which begins from straight sharp edge 4 and terminate with a curved profile having the function of reaming the hole to its full measure.

The profile of the curved cutting edge 5 is preferably an arch of circumference having a radius R which is much longer than the diameter D of stem 1, and preferably R is 3 to 4 times larger than D.

In the preferred embodiment of the drill bit according to the invention, preferably the rake angle of the straight cutting edges 4 is positive, while the rake angle of the curved cutting edges 5 may be positive or negative depending on the composite laminate material to be worked on.

Figure 3:
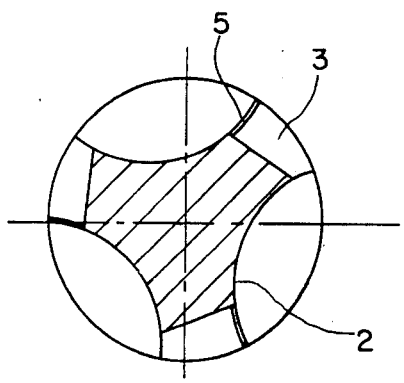
FIG. 3 is a cross section according to line III—III of FIG. 1.

As can be seen more clearly from FIGS. 1 and 3, the curved profile portion of the cutting elements 3 is raked on one side as indicated in 6. Said elements 3 are separated one from the other by semi-circular grooves provided on stem 1.

In order to evaluate the efficiency of the point according to the present invention, comparative tests have been performed with traditional bits or points of the type considered as being best suited for the material to be worked on herein in discussion, and with a bit according to the invention. The bits used for said tests are the following:

(A) a helical bit with center point of Widia, with a cutting edge cone of 180°;

(B) bits having a high conicity (8°-9°) with three cutting edges;

(C) bits having a high conicity (8°-9°) having five cutting edges;

(D) a bit commonly used in aviation industry for this type of work;

(E) the bit according to the invention.

As for the bits according to the A, B, C and D type to tolerance calculated on the diameter of these bits was 0.004 cm, while for the bit according to the present invention, indicated in E, the tolerance on the diameter was 0.002 cm.

Holes have been drilled with these tools using drilling speeds of 18000, 9000 and 4500 r.p.m., on a sheet of carboresin the thickness of which was about 2 mm.

An X-ray picture has been taken in order to evaluate quality of the holes produced with the different bits.

Figure 4:
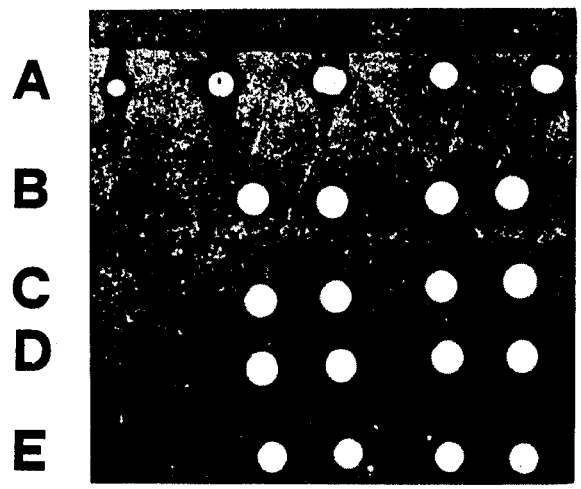
FIG. 4 is a reproduction of an X-ray photograph taken on a carboresin sheet, in which holes have been drilled with different types of bits, to show the quality of the hole produced by the bit according to the present invention.

A photographic reproduction on positive of said X-ray picture is shown in FIG. 4, in which on horizontal lines, holes obtained with the respective bits at the number of r.p.m. indicated above are shown.

It should be noted that bit A produces conspicuous delamination of the material.

Also bits B and C show delaminations of the hole edges, which, though less accentuated, are still conspicuous.

Bit D produces improved holes, but the risk of delamination is still high, as shown by the halo around the edges of the holes.

Bit E, according to the invention instead, produces holes which are dimensionally more accurate and which are, moreover, free from delamination on the backside of the sheet.

The bit according to the invention is preferably made from a hard alloy metal material. A material which has proven particularly suited is tungsten carbide.

I claim:

1. A drill bit for drilling a hole in a composite material comprising a plastic laminate incorporating graphite carbon or glass fibers, said bit comprising an odd number of cutting elements, each including a first straight cutting edge and a second curved cutting edge, and having an axis about which said bit is rotated for drilling a hole, each of said cutting elements comprising:

a first quadrilateral face lying on a place forming a low conicity angle with said axis, a first side of said quadrilateral face being oriented in a direction so as to cross said axis and forming said first cutting edge, said first cutting edge terminating at a distance from said axis;

a second face and a third face, each having a side common to said first face and forming a dihedral angle therebetween, the edge of said dihedral angle running from said first straight cutting edge to a point on said axis opposite to an end of the bit with reference to said first straight cutting edge whereby the sides common to said third and second faces of adjacent cutting elements meet at said point on the axis of the bit;

and said second curved cutting edge angularly merging with said first straight cutting edge, said second cutting edge having a curved profile lying in a plane crossing said axis, with a radius three- to four-fold the diameter of the bit, said second cutting edge being defined by the intersection of a solid of revolution having a surface of said radius and a cylinder having an axis parallel to said axis of the bit and tangential to a point at which said first and said second cutting edges meet, whereby a concave cylinder profile is formed between a pair of adjacent cutting elements.

2. A bit according to claim 1, wherein projections of said first cutting edge on a plane normal to said axis of the bit in the direction of said axis, form bisectrices of the angles of a regular polygon having a number of sides equal to the number of said cutting elements and having its center on said axis of the bit.

3. A bit according to claim 1, wherein said first cutting edges have a conicity angle of 118°.

4. A bit according to claim 1, wherein said first cutting edges have a positive rake angle.

* * * * *